United States Patent
Wang et al.

(10) Patent No.: US 8,499,734 B2
(45) Date of Patent: Aug. 6, 2013

(54) SYSTEM AND METHOD FOR CONTROLLING TORQUE DURING ENGINE START OPERATIONS IN HYBRID VEHICLES

(75) Inventors: Lan Wang, Troy, MI (US); Goro Tamai, West Bloomfield, MI (US); Michael J. Pitsch, Ann Arbor, MI (US); William L. Aldrich, III, Davisburg, MI (US)

(73) Assignee: GM Global Technology Operations LLC

( * ) Notice: Subject to any disclaimer, the term of this patent is extended or adjusted under 35 U.S.C. 154(b) by 959 days.

(21) Appl. No.: 12/603,014

(22) Filed: Oct. 21, 2009

(65) Prior Publication Data
US 2011/0088659 A1   Apr. 21, 2011

(51) Int. Cl.
*F02N 11/08* (2006.01)

(52) U.S. Cl.
USPC ............................. 123/179.4; 123/179.3

(58) Field of Classification Search
USPC ............ 123/179.3, 179.4, 179.16, 179.18, 123/345, 347, 349, 350, 376; 701/113; 290/30 R, 38 R, 38 E
See application file for complete search history.

(56) References Cited

U.S. PATENT DOCUMENTS

| | | | | |
|---|---|---|---|---|
| 6,619,258 B2 * | 9/2003 | McKay et al. | | 123/350 |
| 7,383,119 B2 * | 6/2008 | Lewis | | 701/112 |
| 7,778,767 B2 * | 8/2010 | Santoso et al. | | 701/113 |
| 2002/0179047 A1 * | 12/2002 | Hoang et al. | | 123/350 |

* cited by examiner

*Primary Examiner* — Willis R Wolfe, Jr.
*Assistant Examiner* — Anthony L Bacon

(57) ABSTRACT

A control system for a hybrid vehicle that includes an internal combustion engine and an electric motor includes an engine speed control module, an air pressure control module, and an engine torque control module. The engine speed control module increases engine speed during a first calibration period based on a driver torque request and a predetermined torque threshold. The air pressure control module decreases intake manifold pressure (MAP) of the engine during a second calibration period based on the driver torque request and the predetermined torque threshold. The engine torque control module starts the engine during a period after the first and second calibration periods by activating N of M cylinders of the engine, wherein N is based on the driver torque request and the predetermined torque threshold.

20 Claims, 4 Drawing Sheets

SYSTEM AND METHOD FOR CONTROLLING TORQUE DURING ENGINE START OPERATIONS IN HYBRID VEHICLES

FIELD

The present disclosure relates to internal combustion engines and more particularly to a system and method for controlling engine torque during engine start operations in hybrid vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

A control system for a hybrid vehicle that includes an internal combustion engine and an electric motor includes an engine speed control module, an air pressure control module, and an engine torque control module. The engine speed control module increases engine speed during a first calibration period based on a driver torque request and a predetermined torque threshold. The air pressure control module decreases intake manifold pressure (MAP) of the engine during a second calibration period based on the driver torque request and the predetermined torque threshold. The engine torque control module starts the engine during a period after the first and second calibration periods by activating N of M cylinders of the engine, wherein N is based on the driver torque request and the predetermined torque threshold.

A method for controlling a hybrid vehicle that includes an internal combustion engine and an electric motor includes increasing engine speed during a first calibration period based on a driver torque request and a predetermined torque threshold, decreasing intake manifold pressure (MAP) of the engine during a second calibration period based on the driver torque request and the predetermined torque threshold, and starting the engine during a period after the first and second calibration periods by activating N of M cylinders of the engine, wherein N is based on the driver torque request and the predetermined torque threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
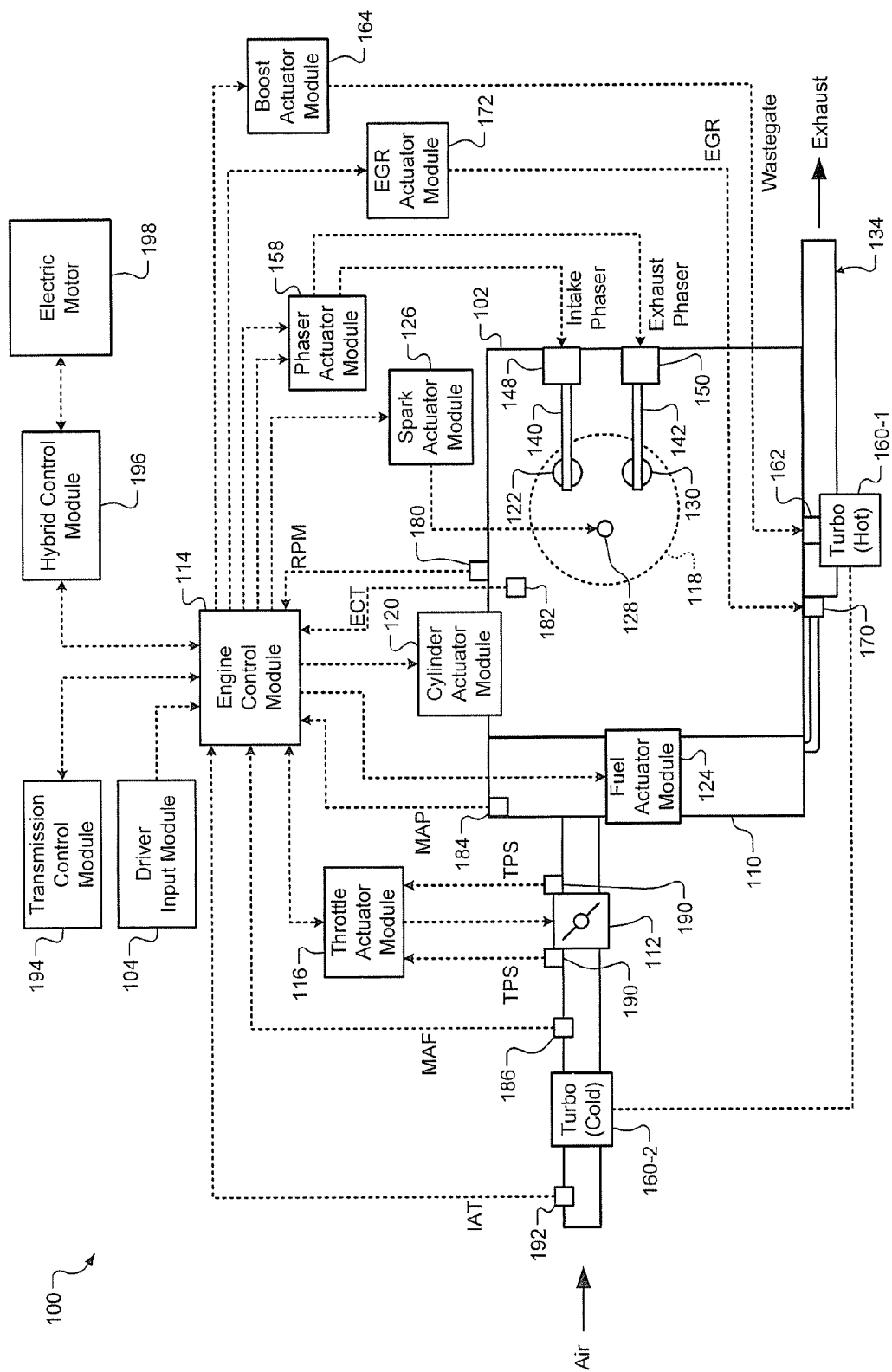
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Hybrid vehicles may include an internal combustion engine and an electric motor. The electric motor may be used more often when vehicle kinetic energy can be recovered by regenerative braking, converted to electric and chemical form, and stored in a battery, from which the electric motor is driven (e.g. in city driving). The internal combustion engine may be used when wheel braking and opportunities for energy recovery are infrequent, and the engine operates at its greatest efficiency (e.g. in highway driving). In mixed city and highway driving conditions, the electric motor and internal combustion engine may be used together to transmit power to a transmission input shaft, depending on driving conditions and the magnitude of the battery capacity.

Hybrid vehicles may experience long periods of engine off-time during idle and low-speed driving scenarios where the electric motor is used. However, hybrid vehicles may also use the electric motor for initial propulsion of the vehicle and for starting the engine and use the internal combustion engine during all other scenarios. These hybrid vehicles may be referred to as "mild hybrid" vehicles. Mild hybrid vehicles may include a smaller battery and a smaller electric motor than conventional hybrid vehicles due to the infrequent use of the electric motor and lower power requirements.

Engine "start-stop" operation may be used to improve fuel economy in hybrid vehicles. More specifically, during periods when the engine would normally be idling, control may cut fueling to the engine causing the engine to stop. However, when a driver is about to request the vehicle to accelerate, control may restart the engine. Active fuel management (AFM), otherwise known as cylinder deactivation, may also be used to improve fuel economy in vehicles. Cylinder deactivation includes deactivating (i.e. closing valves and/or stopping a supply of fuel) one or more cylinders of an engine during low-load and cruising conditions to reduce pumping losses.

Conventional engine control systems control transitions from engine-off to engine-on operation (i.e. engine start operations) such that noise, vibration, and/or harshness (NVH) occurs. In other words, starting the engine may be loud and/or a sudden increase in engine torque may be felt by the driver. Therefore, a system and method is presented that controls engine torque to reduce NVH during engine start operations in a mild hybrid vehicle. More specifically, the system and method presented increases a rotational speed of a crankshaft of the engine, enables intake/exhaust valve actuation, and then decreases a pressure inside an intake manifold of the engine based on a driver torque request during a period before supplying fuel and/or spark to the engine (i.e. starting the engine). More specifically, the system and method presented may increase the speed of the crankshaft using the electric motor and may decrease MAP by actuating the throttle. For example, the MAP may be equal to barometric pressure due to pressure leaks during engine-off operation. Furthermore, the system and method presented may supply fuel to less than all of the cylinders of the engine (e.g., half) to control engine torque, resulting in a smoother engine start operation.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110. In one embodiment, the ECM 114 may implement the system and/or method of the present disclosure.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
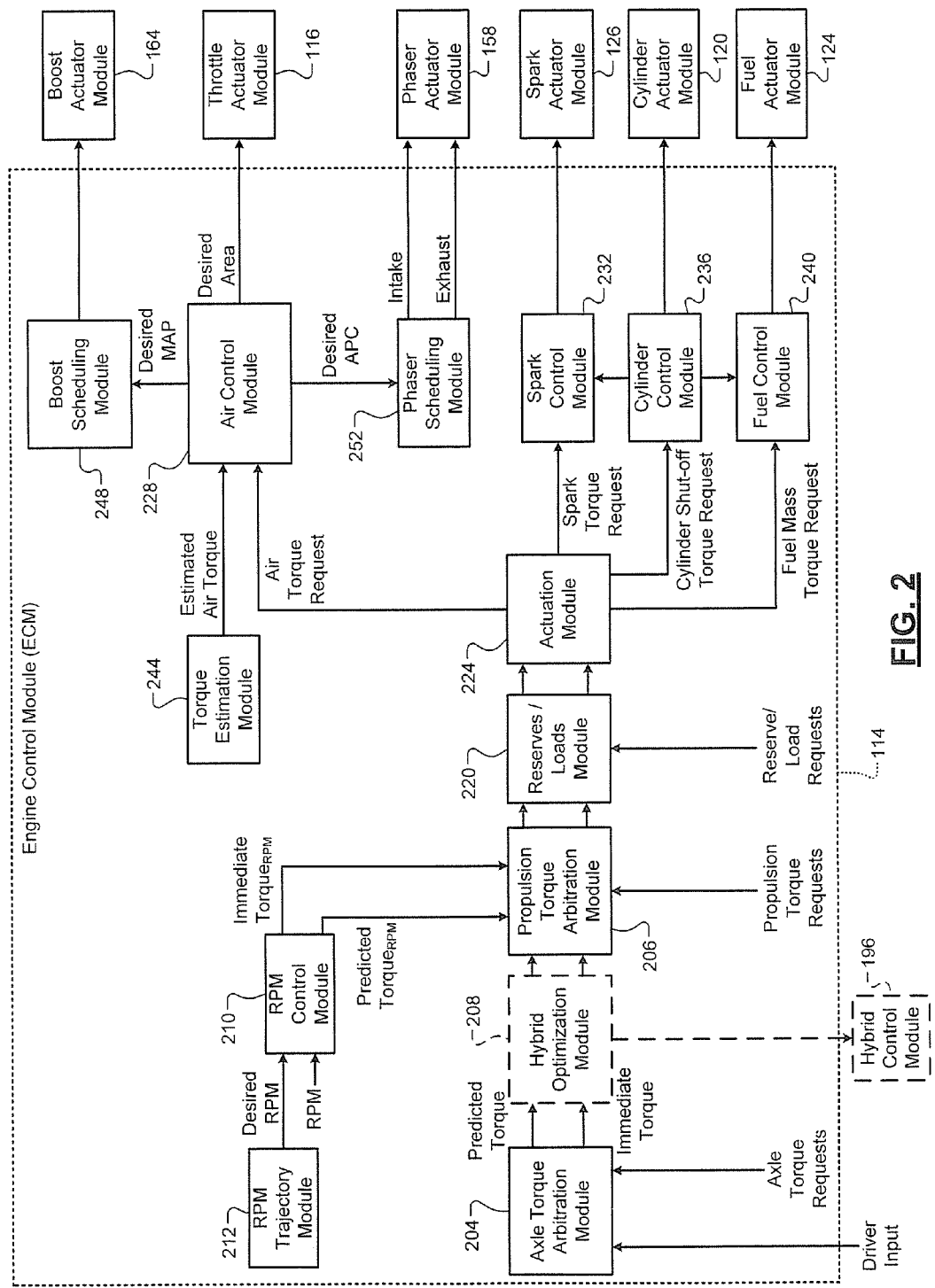
FIG. 2 is a functional block diagram of an exemplary engine control system according to the present disclosure.

Referring now to FIG. 2, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may require retarded spark advance. The reserves/loads module 220 may therefore increase the predicted torque request above the immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, corresponding torque reserves may be requested in order to create a spark retard. The spark retard can be removed to allow a quick response to decreases in engine torque output that result from leaning the air/fuel mixture during these processes.

The reserves/loads module 220 may also create a reserve in anticipation of a future load, such as power steering pump operation or engagement of an air conditioning (A/C) compressor clutch. The reserve for engagement of the A/C compressor clutch may be created when the driver first requests air conditioning. Then, when the A/C compressor clutch engages, the reserves/loads module 220 may add the expected load of the A/C compressor clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value) and all cylinders being fueled.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \qquad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold and using stoichiometric fueling. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Figure 3:
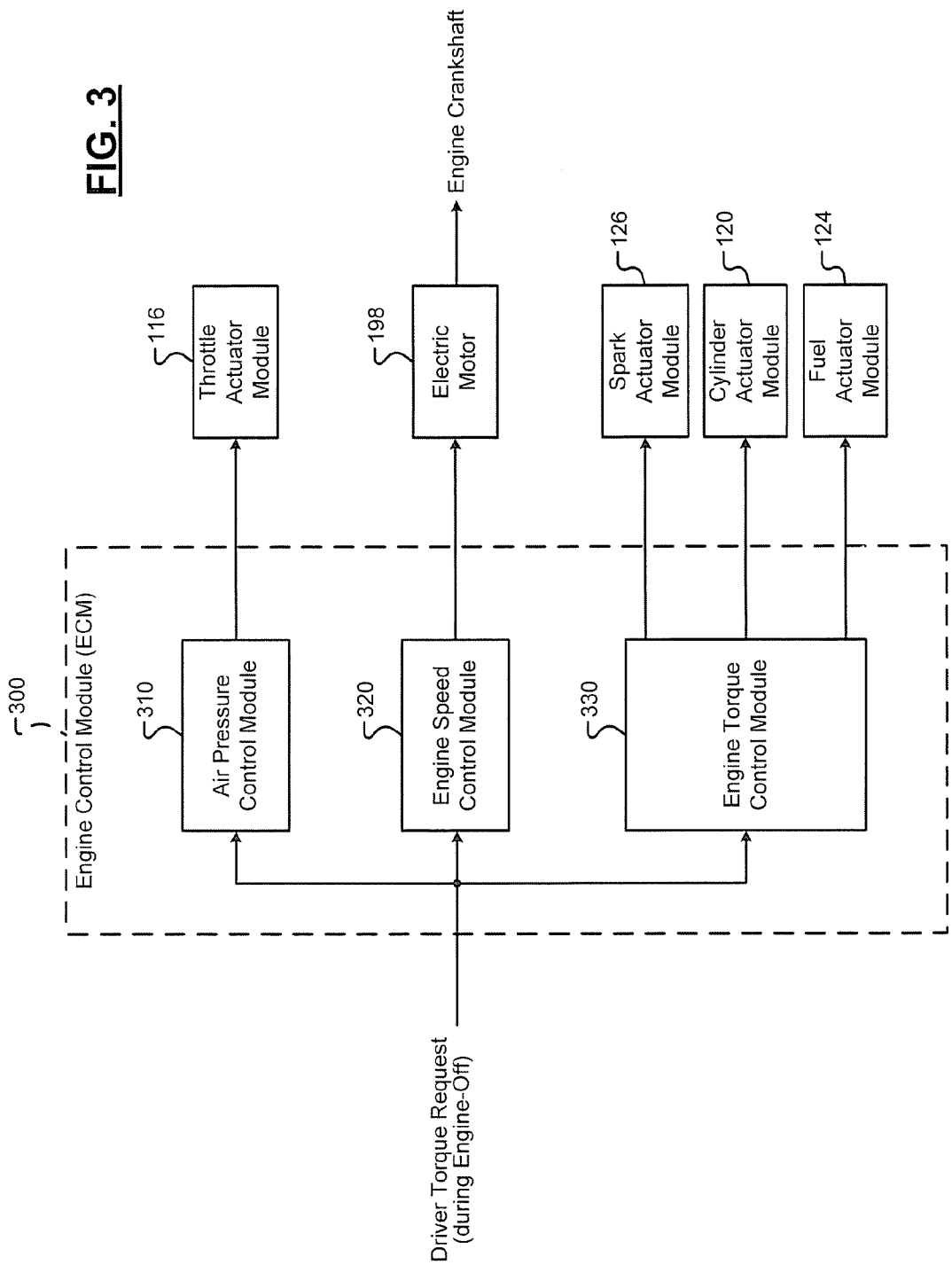
FIG. 3 is a functional block diagram of an exemplary engine control module according to the present disclosure.

Referring now to FIG. 3, a functional block diagram of an exemplary engine control module (ECM) 300 is presented. The ECM 300 may include an engine speed control module 310, an air pressure control module 320, and an engine torque control module 330. The exemplary ECM 300 may implement the system and/or method of the present disclosure. Furthermore, while not down, the ECM 300 may include the various systems and modules shown in FIG. 2 and discussed in detail above.

The engine speed control module 310 may receive a driver torque request. For example, the driver torque request may correspond to a position of an accelerator pedal of a vehicle. The engine speed control module 310 may determine a rotational speed of the engine crankshaft (i.e. engine speed), measured in revolutions per minute (RPM), to reduce NVH during a transition from engine-off to engine-on operation. More specifically, the engine speed control module 310 may compare the driver torque request to a predetermined torque threshold to determine the engine speed.

The engine speed control module 310 may control the engine speed during a first calibration period before starting (i.e. supplying fuel to) the engine 102. For example, the engine speed control module 310 may increase engine speed to a first predetermined engine speed when the driver torque request is less than the predetermined torque threshold. For example only, the first predetermined engine speed may be less than 1000 RPM. Alternatively, for example, the engine speed control module 310 may increase the engine speed to a second predetermined engine speed when the driver torque request is greater than the predetermined torque threshold. The second predetermined engine speed may be greater than the first predetermined engine speed. For example only, the second predetermined engine speed may be greater than or equal to 1000 RPM.

The engine speed control module 310 may then increase the engine speed to one of the first predetermined engine speed and the second predetermined engine speed. The engine speed control module 310 may increase the engine speed using the electric motor 198. In other words, the engine speed control module 310 may increase the engine speed by driving the engine crankshaft with the electric motor 198 before enabling intake/exhaust valve actuation. For example, the electric motor 198 may drive the engine crankshaft directly, via a belt system, or via a planetary gearset. However, the electric motor 198 may also drive the engine crankshaft via other indirect methods. Increasing the engine speed using the electric motor 198 prior to starting the engine 102 may result in a smoother engine start operation and thus decreased NVH.

The engine torque control module 330 may then enable intake/exhaust valve actuation. In other words, the engine torque control module 330 may enable intake/exhaust valve actuation during the first calibration period. However, while the engine torque control module 330 may enable intake/exhaust valve actuation, another module may enable intake/exhaust valve actuation, such as a valve control module (not shown). The engine torque control module 330 may enable intake/exhaust valve actuation after the engine speed control module 310 increases the engine speed.

The air pressure control module 320 may control intake manifold absolute pressure (MAP) during a second calibration period before starting the engine 102 (i.e. supplying fuel to the engine 102). In one embodiment, the second calibration period may be the same as the first calibration period. However, it can be appreciated that the second period may be shorter or longer than the first calibration period, and may run either before, concurrently with, or after the first calibration period. In other words, the air pressure control module may decrease MAP after the engine control module 330 enables intake/exhaust valve actuation.

The air pressure control module 320 may determine the MAP to reduce NVH during a transition from engine-off to engine-on operation. More specifically, the air pressure control module 320 may compare the driver torque request to a predetermined torque threshold to determine the MAP. For example, the air pressure control module 320 may decrease MAP to a predetermined MAP level. For example only, the predetermined MAP level may be zero (i.e. vacuum). The air pressure control module 320 may decrease the MAP by controlling the throttle 112. For example, the air pressure control module 320 may actuate the throttle 112 using the throttle actuator module 116.

The engine torque control module 330 may then control engine torque based on the driver torque request after the first and second calibration periods (described above) are complete. The engine torque control module 330 may control fuel supplied to the cylinders 118 and/or spark supplied to the cylinders 118. In other words, the engine torque control module 330 may activate at least one of the cylinders 118 by supplying fuel and spark to the corresponding cylinders 118. More specifically, the engine torque control module 330 may compare the driver torque request to a predetermined torque threshold to determine the engine torque.

For example, the engine torque control module 330 may supply fuel and/or spark to a first set of the plurality of cylinders 118 when the driver torque request is less than the predetermined torque threshold. For example only, the first set may include half of the plurality of cylinders 118. Alternatively, for example, the engine torque control module 330 may supply fuel and/or spark to a second set of the plurality of cylinders 118 when the driver torque request is greater than the predetermined torque threshold. The second set may include more of the plurality of cylinders 118 than the first set. For example only, the second set may include all of the plurality of cylinders 118.

The engine torque control module 330 may then increase engine torque based on the driver torque request. The engine torque control module 330 may control the engine torque using at least one of the fuel actuator module 124 and the spark actuator module 126. For example, the engine torque control module 330 may retard spark by a predetermined percentage to offset increasing torque when starting the engine 102. For example only, the predetermined percentage may be 70%.

Starting the engine and controlling engine torque after the first and second calibration periods by supplying fuel and/or spark to one of the first set and the second set of the plurality of cylinders 118 may result in decreased NVH. In other words, the engine torque control module 330 may supply fuel and/or spark to less than the entire plurality of cylinders 118 when the driver torque request is low (i.e. below the predetermined threshold) to achieve a smoother start operation and thus the decreased NVH.

Figure 4:
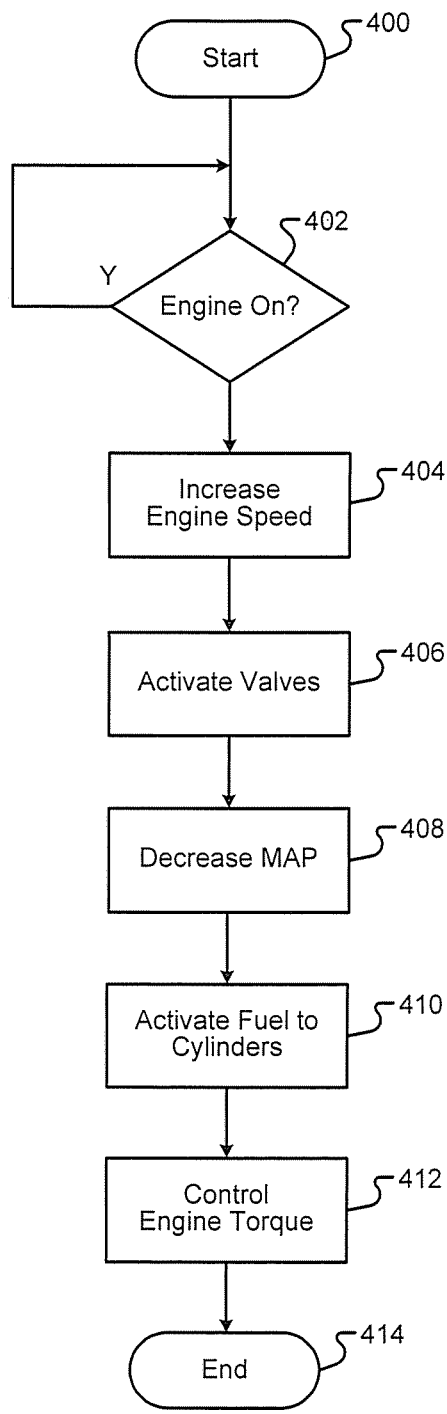
FIG. 4 is a flow diagram illustrating an exemplary method of controlling engine torque during transient periods according to the present disclosure.

Referring now to FIG. 4, a flow diagram of an exemplary method for controlling engine torque during transient periods begins in step 400. In step 402, control determines whether the engine 102 is off. If false, control may return to step 402. If true, control may proceed to step 404. In step 404, control may increase engine speed to one of the first and second engine speed levels based on the driver torque request and the predetermined torque threshold during the first calibration period.

In step 406, control may enable intake/exhaust valve actuation. In step 408, control may decrease MAP to the predetermined MAP level during the second calibration period. In step 410, control may determine whether to activate fuel supplied to one of the first set and the second set of the plurality of cylinders 118 based on the driver torque request and the predetermined torque threshold. In step 412, control may regulate engine torque by controlling at least one of air, fuel, and spark supplied to each of the determined set of the plurality of cylinders 118. Control may then end in step 414.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a hybrid vehicle that includes an internal combustion engine and an electric motor, comprising:
an engine speed control module that increases engine speed during a first calibration period based on a driver torque request and a predetermined torque threshold;
an air pressure control module that decreases intake manifold pressure (MAP) of the engine during a second calibration period based on the driver torque request and the predetermined torque threshold; and
an engine torque control module that starts the engine during a period after the first and second calibration periods by activating N of M cylinders of the engine, wherein N is less than M at the end of the period when the driver torque request is less than the predetermined torque threshold.

2. The control system of claim 1, wherein the engine speed control module increases the engine speed to a first engine speed level when the driver torque request is less than the predetermined torque threshold, and that increases the engine speed to a second engine speed level when the driver torque request is greater than the predetermined torque threshold.

3. The control system of claim 2, wherein the second engine speed level is greater than the first engine speed level.

4. The control system of claim 1, wherein the engine speed control module increases the engine speed by using the electric motor to drive a crankshaft of the engine.

5. The control system of claim 4, wherein the electric motor drives the crankshaft of the engine one of directly, via a belt system, and via a planetary gearset.

6. The control system of claim 1, wherein the air pressure control module decreases the MAP to a predetermined MAP level by controlling a throttle.

7. The control system of claim 1, wherein N is equal to M at the end of the period when the driver torque request is greater than the predetermined threshold.

8. The control system of claim 1, wherein the engine torque control module enables valve actuation during the first calibration period, wherein the valve actuation occurs after the engine speed control module increases the engine speed and before the air pressure control module decreases the MAP.

9. The control system of claim 1, wherein the engine torque control module controls at least one of air, fuel, and spark supplied to the N cylinders based on the driver torque request.

10. The control system of claim 1, wherein the driver torque request is based on a position of an accelerator pedal of the vehicle.

11. A method for controlling a hybrid vehicle that includes an internal combustion engine and an electric motor, comprising:
increasing engine speed during a first calibration period based on a driver torque request and a predetermined torque threshold;
decreasing intake manifold pressure (MAP) of the engine during a second calibration period based on the driver torque request and the predetermined torque threshold; and
starting the engine during a period after the first and second calibration periods by activating N of M cylinders of the engine, wherein N is less than M at the end of the period when the driver torque request is less than the predetermined torque threshold.

12. The method of claim 11, further comprising:
increasing the engine speed to a first engine speed level when the driver torque request is less than the predetermined torque threshold; and
increasing the engine speed to a second engine speed level when the driver torque request is greater than the predetermined torque threshold.

13. The method of claim 12, wherein the second engine speed level is greater than the first engine speed level.

14. The method of claim 11, further comprising:
increasing the engine speed by using the electric motor to drive a crankshaft of the engine.

15. The method of claim 14, wherein the electric motor drives the crankshaft of the engine one of directly, via a belt system, and via a planetary gearset.

16. The method of claim 11, further comprising:
decreasing the MAP to a predetermined MAP level by controlling a throttle.

17. The method of claim 11, wherein N is equal to M at the end of the period when the driver torque request is greater than the predetermined threshold.

18. The method of claim 11, further comprising:
enabling valve actuation during the first calibration period, wherein the enabling occurs after the engine speed is increased and before the MAP is decreased.

19. The method of claim 11, further comprising:
controlling at least one of air, fuel, and spark supplied to the N cylinders based on the driver torque request.

20. The method of claim 11, wherein the driver torque request is based on a position of an accelerator pedal of the vehicle.

* * * * *